United States Patent
Clerc et al.

(10) Patent No.: US 7,472,610 B2
(45) Date of Patent: Jan. 6, 2009

(54) APPARATUS, SYSTEM, AND METHOD FOR DIFFERENTIAL PRESSURE MEASUREMENT ACROSS A CONDUIT FLOW AREA CHANGE

(75) Inventors: James C. Clerc, Columbus, IN (US); Patrick M. Klein, Madison, WI (US); Timothy M. Doyle, Madison, WI (US)

(73) Assignee: Cummins Filtration IP, Inc, Minneapolis, MN (US)

( * ) Notice: Subject to any disclaimer, the term of this patent is extended or adjusted under 35 U.S.C. 154(b) by 82 days.

(21) Appl. No.: 11/608,707

(22) Filed: Dec. 8, 2006

(65) Prior Publication Data

US 2008/0134796 A1 Jun. 12, 2008

(51) Int. Cl.
*G01L 7/00* (2006.01)
(52) U.S. Cl. .................. 73/862.52; 73/861.42
(58) Field of Classification Search .............. 73/861.42, 73/861.52
See application file for complete search history.

(56) References Cited

U.S. PATENT DOCUMENTS

| | | | | |
|---|---|---|---|---|
| 3,838,598 A | * | 10/1974 | Tompkins | ................ 73/861.52 |
| 5,961,931 A | * | 10/1999 | Ban et al. | ................... 422/171 |
| 6,502,467 B1 | | 1/2003 | Fincke | |
| 6,601,460 B1 | * | 8/2003 | Materna | ................... 73/861.52 |
| 7,028,467 B2 | | 4/2006 | Kuboshima et al. | |
| 7,059,205 B1 | | 6/2006 | Weaver | |
| 7,086,220 B2 | * | 8/2006 | Imai et al. | ..................... 60/274 |
| 7,211,226 B2 | * | 5/2007 | Liu et al. | ..................... 422/168 |
| 7,254,940 B2 | * | 8/2007 | Saitoh et al. | .................. 60/295 |
| 7,343,738 B2 | * | 3/2008 | Tsutsumoto et al. | .......... 60/295 |
| 2007/0283683 A1 | * | 12/2007 | Bellinger | ..................... 60/285 |
| 2008/0087101 A1 | * | 4/2008 | Konstandopoulos | ..... 73/861.42 |

OTHER PUBLICATIONS

PCT International Search Report and Written Opinion of the International Searching Authority, or the Declaration, May 20, 2008.

* cited by examiner

*Primary Examiner*—Edward Lefkowitz
*Assistant Examiner*—Freddie Kirkland, III
(74) *Attorney, Agent, or Firm*—Kunzler & McKenzie

(57) ABSTRACT

An apparatus, system, and method are disclosed for differential pressure measurement across a fluid conduit flow area change. The apparatus may include a particulate filter, a differential pressure sensor, and a fluid conduit size change downstream of the particulate filter. The apparatus may include a tube configured to place the downstream differential pressure sensor port in fluid contact with a uniform flow region of the fluid conduit downstream of the particulate filter. An apparatus is thereby provided to measure differential pressure across a fluid conduit flow area change such that the differential pressure measurement is minimally affected by the change in flow characteristics induced by the change in cross-sectional flow area.

23 Claims, 6 Drawing Sheets

APPARATUS, SYSTEM, AND METHOD FOR DIFFERENTIAL PRESSURE MEASUREMENT ACROSS A CONDUIT FLOW AREA CHANGE

BACKGROUND OF THE INVENTION

1. Field of the Invention

The present invention relates to measuring differential pressure in a conduit, and more particularly relates to measuring differential pressure across a soot filter in the presence of a change in conduit diameter.

2. Description of the Related Art

Recent emissions regulations have required the use of aftertreatment components in many internal combustion engine applications. Many aftertreatment components utilize a differential pressure measurement to control various aspects of the component. For example, particulate filters capture soot from the exhaust stream, and the captured soot is later oxidized and vented to the atmosphere as carbon dioxide or carbon monoxide. The differential pressure across the particulate filter may be used to determine how much soot remains on the particulate filter. If excessive soot is allowed to build up on the particulate filter, the rate of soot oxidation can generate large amounts of heat in a short period of time and cause temperature spikes and large temperature gradients. Temperature spikes can melt the particulate filter, while temperature gradients can cause cracking or other stress related failures.

Many control mechanisms for particulate filters rely partially or completely on a differential pressure measurement to predict the amount of particulate loading on the filter. If the measurement is consistently higher than the true differential pressure, regeneration events of the particulate filter may be too frequent, resulting in loss of fuel economy and filter fatigue failure before the design life is complete. If the measurement is consistently lower than the true differential pressure, the actual particulate loading in the filter may be higher than the intended design, resulting in an increased risk of runaway oxidation of particulates and an uncontrolled regeneration event, often resulting in the complete failure of the particulate filter.

The physical layout of many applications requires that the exhaust systems change diameter along the length of the fluid conduit. When the exhaust system changes diameter near the particulate filter, the differential pressure measurement in a conventional system is not as reliable. For example, when the diameter increases downstream of the particulate filter, the differential pressure appears to be greater than the actual value in most systems. If the diameter decreases downstream of the particulate filter, the differential pressure appears to be lower than the actual value in most systems.

In the current technology, these variations are accounted for in the controls software of the application. The computer calculates the effect of the flow area change on the differential pressure according to the flow rate, temperature, particulate loading, and other variables. Such calculation results in an intensive modeling and calibration effort for each application, and a modest change in the system requires a different calibration. Further, these models are only modestly able to correct for all of the variables, and still suffer from significant offsets between the true and modeled differential pressure.

From the foregoing discussion, applicant asserts that a need exists for an apparatus, system, and method that provides for differential pressure measurement across a conduit flow area change in an aftertreatment system. Beneficially, such an apparatus, system, and method would achieve accurate differential pressure measurements in a simple, reliable fashion that reduces the calibration and modeling efforts required for each application.

SUMMARY OF THE INVENTION

The present invention has been developed in response to the present state of the art, and in particular, in response to the problems and needs in the art that have not yet been fully solved by currently available afterteatment systems. Accordingly, the present invention has been developed to provide an apparatus, system, and method for differential pressure measurement across a conduit flow area change that overcome many or all of the above-discussed shortcomings in the art.

An apparatus is disclosed for differential pressure measurement across a fluid conduit flow area change in accordance with the present invention. The apparatus may comprise a first fluid conduit portion which may be an exhaust pipe for an internal combustion engine. The apparatus may further comprise a second fluid conduit portion. The first and second fluid conduit portions may comprise differing cross-sectional areas, or flow areas.

The apparatus may further comprise an aftertreatment component, which may be configured with a flow inlet and a flow outlet. The flow inlet may accept flow from the first conduit portion, and the flow outlet may emit flow to the second fluid conduit portion. The apparatus may further comprise a first sensor port fluidly connected to the first fluid conduit portion, and a second sensor port fluidly connected to the second fluid conduit portion.

The apparatus may further comprise a coupler fluidly connecting the second sensor port to the second fluid conduit portion at a uniform flow region of the second fluid conduit portion. The coupler may comprise an opening in a tube inserted into the second fluid conduit portion such that the opening is within the uniform flow region.

The uniform flow region may comprise a three-dimensional region located downstream from the face of the filter, beginning at the face of the aftertreatment component and continuing to a distance equal to one-half an average width of the aftertreatment component.

The apparatus may further comprise a sensor configured to measure the differential pressure across the aftertreatment component and an electronic control module (ECM). The ECM may be configured to correlate a parameter with the measured differential pressure from the sensor. The ECM may further comprise a software calibration or the like which may comprise the software, algorithms, and data to correlate the measured differential pressure with the correlated parameter.

In an alternate embodiment, an apparatus is disclosed wherein the tube may include an axial portion comprising sides, and a capped end. The capped end may point toward the downstream face, or flow outlet, of the aftertreatment component. The coupler may comprise a plurality of openings in the sides of the axial portion of the tube.

In another alternate embodiment, an apparatus is disclosed which may further comprise a perforated ring coupled to the downstream end of the aftertreatment component. In one embodiment, the uniform flow region may comprise a three-dimensional region located within the perforated ring.

A method is disclosed for upfitting a differential pressure measurement across an aftertreatment component in accordance with the present invention. The method may include a practitioner providing an aftertreatment component within a first fluid conduit portion upstream of the aftertreatment component, and a second fluid conduit portion downstream of the aftertreatment component. The method may further include the practitioner providing a differential pressure sensor configured to measure the differential pressure across the aftertreatment component, where the differential pressure sensor comprises a first sensor port fluidly connected to the first fluid conduit portion and a second sensor port fluidly connected to the second fluid conduit portion.

The method may continue with the practitioner disconnecting the second sensor port of the differential pressure sensor, and installing a coupler fluidly connecting the second sensor port to the second fluid conduit at a uniform flow region by inserting a tube into the second fluid conduit. The tube may comprise at least one opening, where the tube is configured such that the opening is within the uniform flow region of the second fluid conduit. The practitioner may then reconnect the second sensor port of the differential pressure sensor such that the second sensor port fluidly communicates with the tube. The practitioner may update a software calibration on an ECM to update a correlation between a parameter, for example an estimated soot loading, and the differential pressure across the aftertreatment component.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the apparatus, system, and method of the present invention, as presented in FIGS. 1 through 6, is not intended to limit the scope of the invention, as claimed, but is merely representative of selected embodiments of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 1:
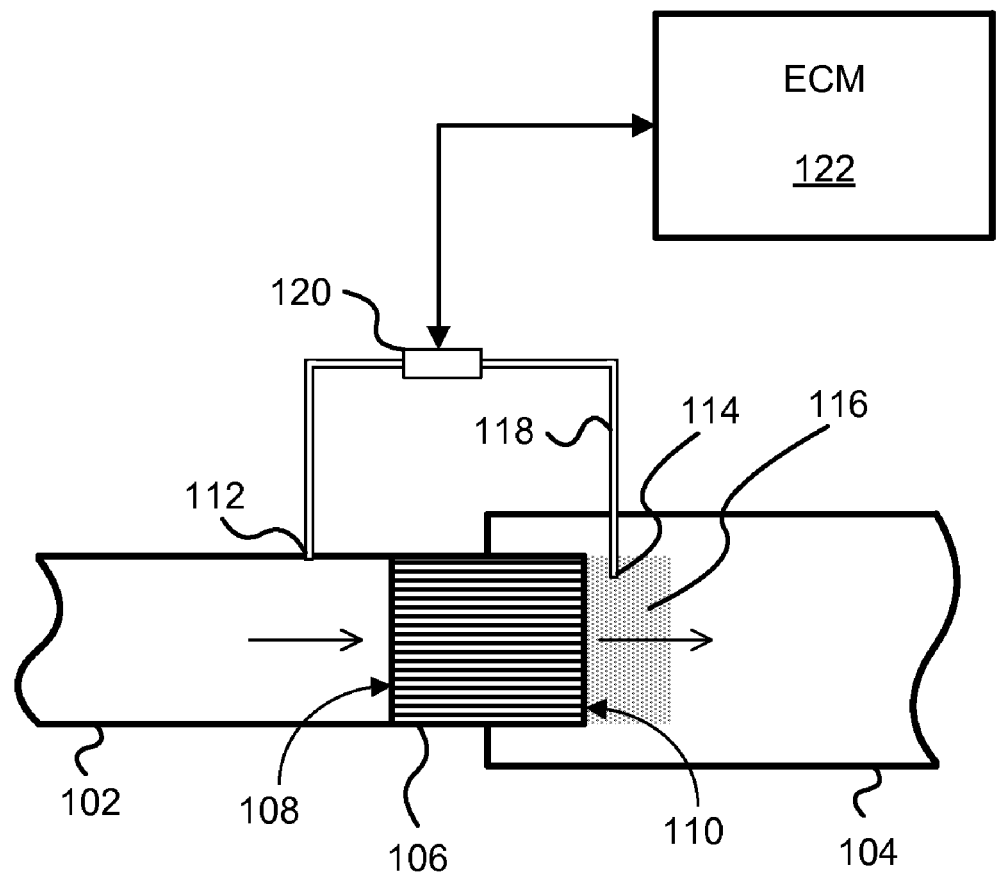
FIG. 1 is a schematic block diagram depicting one embodiment of an apparatus for differential pressure measurement across a fluid conduit flow area change in accordance with the present invention.

FIG. 1 is a schematic block diagram depicting one embodiment of an apparatus 100 for differential pressure measurement across a fluid conduit flow area change in accordance with the present invention. The apparatus 100 may comprise a first fluid conduit portion 102 which may be an exhaust pipe for an internal combustion engine. The apparatus 100 may further comprise a second fluid conduit portion 104. The first 102 and second 104 fluid conduit portions may comprise differing cross-sectional areas, or flow areas. In one embodiment, as depicted in FIG. 1, the flow area of the first conduit portion 102 may be smaller than the flow area of the second conduit portion 104.

The apparatus 100 may further comprise an aftertreatment component 106, which may be configured with a flow inlet 108 and a flow outlet 110. The flow inlet 108 may accept flow from the first fluid conduit portion 102, and the flow outlet 110 may emit flow to the second fluid conduit portion 104. The apparatus 100 may further comprise a first sensor port 112 fluidly connected to the first fluid conduit portion 102, and a second sensor port 114 fluidly connected to the second fluid conduit portion 104. In one embodiment, the aftertreatment component 106 may comprise a particulate filter 106.

The apparatus 100 may further comprise a coupler fluidly connecting a second sensor port 114 to the second fluid conduit 104 at a uniform flow region 116. The coupler may comprise a tube 118 with an opening 114 inserted such that the second sensor port 114 is in fluid communication with the uniform flow region 116.

The uniform flow region 116 may comprise a three-dimensional region defined cross-sectionally by the aftertreatment component 106, and defined axially by a region from the aftertreatment component 106 downstream a distance equal to one-half an average width of the aftertreatment component 106. In one embodiment, the shaded region 116 shown in FIG. 1 may comprise the uniform flow region 116. For example, if the aftertreatment component 116 comprises a cylinder of 12-inch diameter, the uniform flow region 116 may comprise a cylindrical region beginning at the downstream face 110 and continuing 6 inches into the second fluid conduit 104, and further defined by an equivalent cross-sectional region to the aftertreatment component 106.

The apparatus 100 may further comprise a sensor 120 configured to measure the differential pressure across the aftertreatment component 106. The apparatus 100 may further comprise an electronic control module (ECM) 122. The ECM 122 may be configured to correlate a parameter (not shown) with the measured differential pressure from the sensor 120. For example, the ECM 122 may be configured to estimate a soot loading on the aftertreatment component 106, to set a fault code for excess backpressure on an engine (not shown), or to estimate soot distribution on the aftertreatment component 106, based on the measurement of the differential pressure across the aftertreatment component 106. The ECM 122 may further comprise a software calibration or the like which may comprise the software, algorithms, and data to correlate the measured differential pressure with the correlated parameter.

Figure 2:
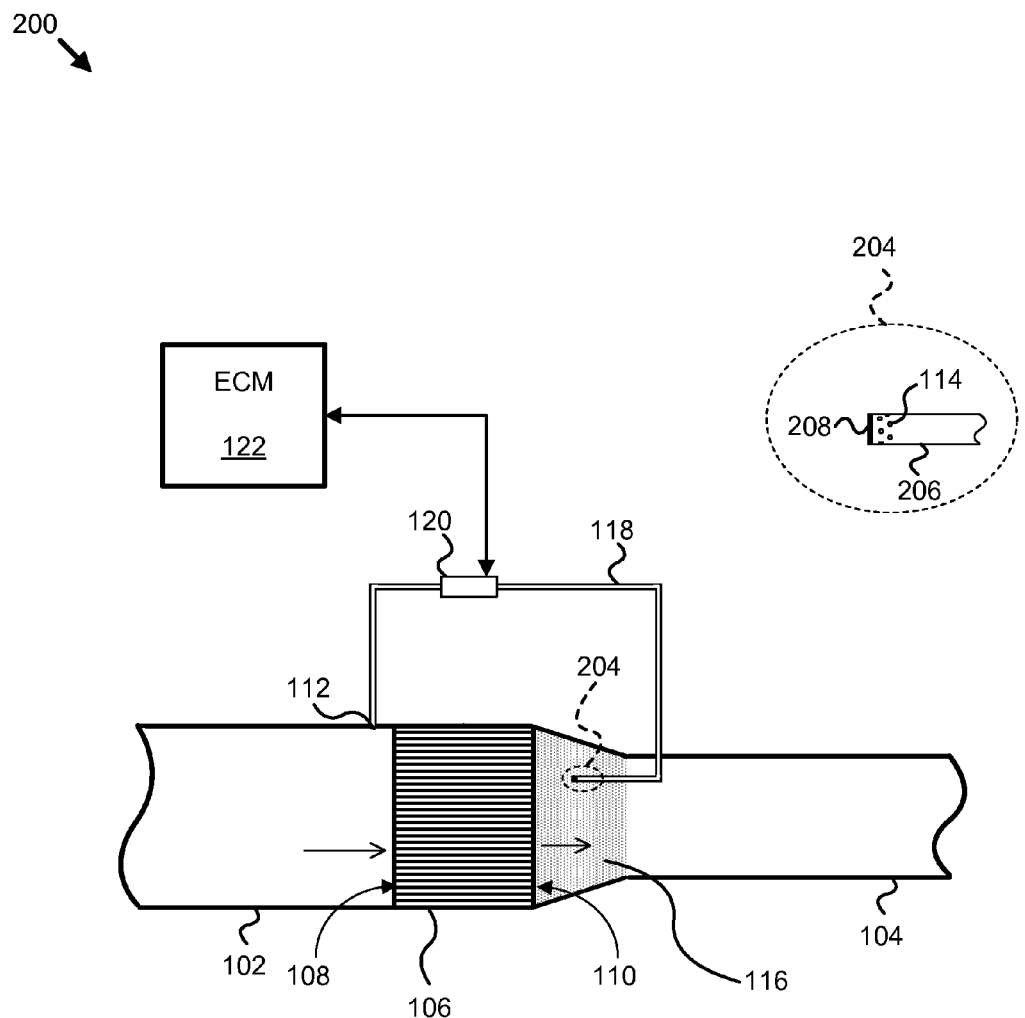
FIG. 2 is a schematic block diagram depicting an alternate embodiment of an apparatus for differential pressure measurement across a fluid conduit flow area change in accordance with the present invention.

FIG. 2 is a schematic block diagram depicting an alternate embodiment of an apparatus 200 for differential pressure measurement across a fluid conduit flow area change in accordance with the present invention. The apparatus 200 may comprise a first fluid conduit portion 102 which may be an exhaust pipe for an internal combustion engine. The apparatus 200 may further comprise a second fluid conduit portion 104. The first 102 and second 104 fluid conduit portions may comprise differing cross-sectional areas, or flow areas. In one embodiment, as depicted in FIG. 2, the flow area of the first conduit portion 102 may be greater than the flow area of the second conduit portion 104.

The apparatus 200 may further comprise an aftertreatment component 106, which may be configured with a flow inlet 108 and a flow outlet 110. The flow inlet 108 may accept flow from the first conduit portion 102, and the flow outlet 110 may emit flow to the second fluid conduit portion 104. The apparatus 200 may further comprise a first sensor port 112 fluidly connected to the first fluid conduit portion 102, and a second sensor port 114 fluidly connected to the second fluid conduit portion 104. In the embodiment of FIG. 2 the coupler may comprise a tube 118 with an axial portion 204, a capped end 208, and holes 114 in the sides 206 such that the second sensor port 114 is in fluid communication with the uniform flow region 116.

The apparatus 200 may further comprise a tube 118, which may include an axial portion 204. Referring to FIG. 2A, the axial portion 204 may comprise sides 206, and a capped end 208. The capped end 208 may point toward the downstream face 110, or flow outlet 110, of the aftertreatment component 106. The second sensor port 114 may comprise a plurality of openings in the sides of the axial portion 204 of the tube 116. A tube 118 with an axial portion 204 similar to that shown in FIG. 2A may be called a "Pitot tube."

The second sensor port 114 may be fluidly connected to the second fluid conduit portion 104 such that the second sensor port 114 fluidly connects to the second fluid conduit portion 104 at a uniform flow region 116 of the second fluid conduit portion 104. The second sensor port 114 may comprise an opening in a tube 118 inserted into the second fluid conduit portion 104 such that the opening 114 is within the uniform flow region 116.

Figure 3:
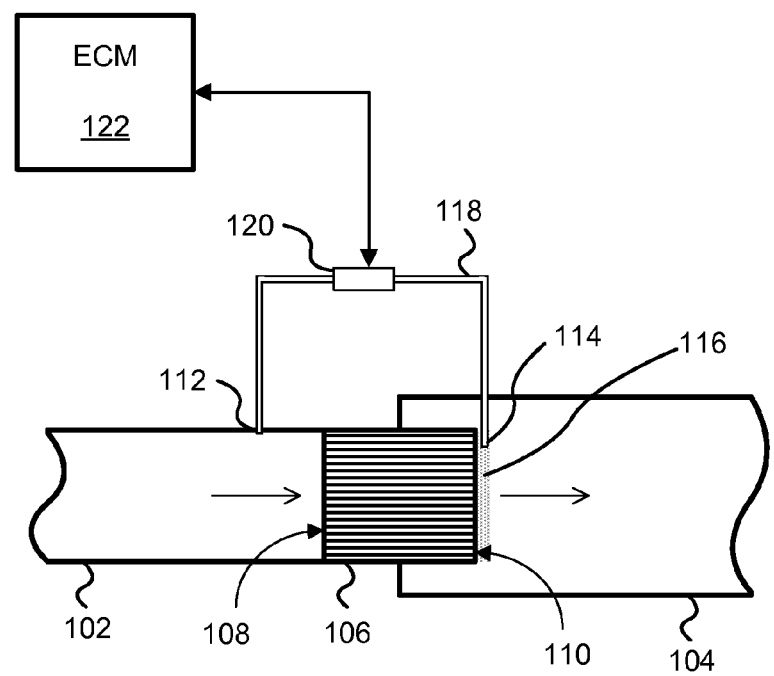
FIG. 3 is a schematic block diagram depicting an alternate embodiment of an apparatus for differential pressure measurement across a fluid conduit flow area change in accordance with the present invention.

FIG. 3 is a schematic block diagram depicting an alternate embodiment of an apparatus 300 for differential pressure measurement across a fluid conduit flow area change in accordance with the present invention. In one embodiment of the apparatus 300 shown in FIG. 3, the uniform flow region 116 may comprise a three-dimensional region defined cross-sectionally by the aftertreatment component 106, and defined axially by a region from one-tenth inch downstream of the aftertreatment component 106 to one inch downstream of the aftertreatment component 106. The one-tenth inch limitation of the uniform flow region 116 may be defined by sheet metal fabrication tolerances, and in some embodiments the uniform flow region 116 may be closer to the aftertreatment component 106 or include the downstream face 110 of the aftertreatment component 106.

The relatively smaller uniform flow region 116 of an embodiment as shown in FIG. 3 may provide greater accuracy of differential pressure measurement for applications requiring greater such accuracy. In one embodiment, a larger uniform flow region 116 similar to FIG. 2 may correct over 50% of the offset between the theoretical differential pressure and a conventionally measured differential pressure. In one embodiment, the smaller uniform flow region 116 similar to FIG. 3 may correct over 90% of the offset between the theoretical differential pressure and a conventionally measured differential pressure.

Figure 4:
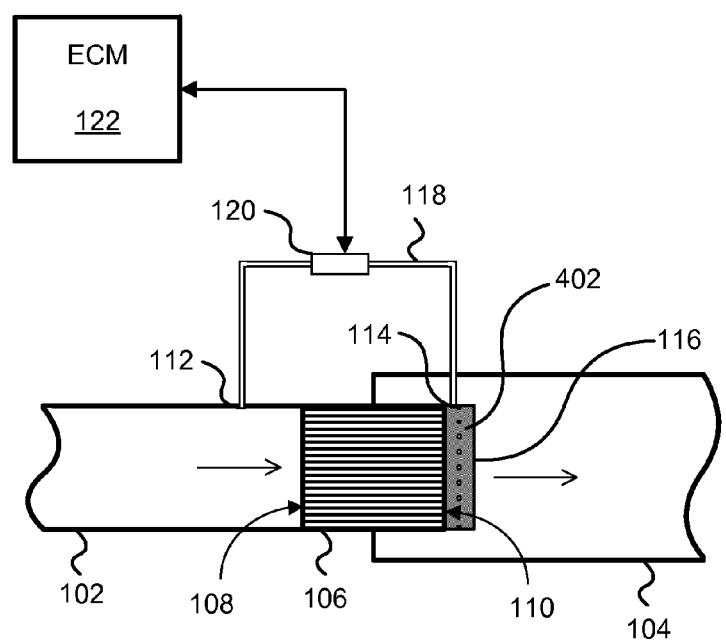
FIG. 4 is a schematic block diagram depicting an alternate embodiment of an apparatus for differential pressure measurement across a fluid conduit flow area change in accordance with the present invention.

FIG. 4 is a schematic block diagram depicting an alternate embodiment of an apparatus 400 for differential pressure measurement across a fluid conduit flow area change in accordance with the present invention. One embodiment of the apparatus 400 may comprise a perforated ring 402 coupled to the downstream end 110 of the aftertreatment component 106, wherein the uniform flow region comprises a region defined cross-sectionally by the ring 402, and defined axially by an axial extent of the ring 402. The second sensor port 114 may fluidly connect the sensor 120 to the uniform flow region 116 through a hole 114 in the tube 118, wherein the tube 118 is inserted into the side of the ring 402. The uniform flow region 116 may further comprise an area defined cross-sectionally by the ring 402, and extending axially downstream of the ring 402 one-half of the diameter of the aftertreatment component 106.

In the embodiment of FIG. 4 the apparatus may comprise a perforated ring 402, and the coupler may comprise a tube 118 inserted such that the tube opening 114 is in fluid communication with the uniform flow region 116 described by the internal volume of the ring 402. The coupler may comprise a tube 118 inserted such that the tube opening 114 is in fluid communication with the uniform flow region 116 comprising the cross-section area of the ring 402, and an axial extent from the downstream face of the aftertreatment component 106 to one-half the diameter of the aftertreatment component downstream of the ring 402.

Figure 5:
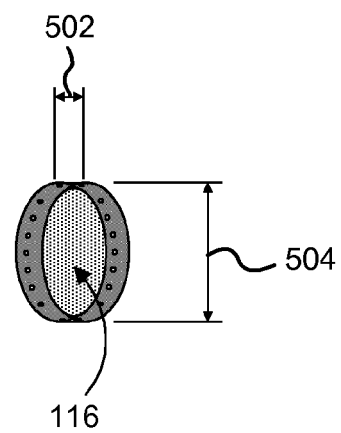
FIG. 5 is an illustration of one embodiment of a perforated ring in accordance with the present invention.

FIG. 5 is an illustration of one embodiment of a perforated ring 402 in accordance with the present invention. The ring 402 may comprise an axial extent 502 and a diameter 504 defining a cross-sectional area. In one embodiment, the uniform flow area 116 may comprise the area defined by the axial extent 502 and cross-sectional area of the ring 402. The ring 402 may comprise shapes other than a circle. For example and without limitation, the ring 402 may comprise a hexagonal, square, or elliptical shape. The ring 402 may be a perimeter extension of any shape, wherein the shape in a typical embodiment corresponds to the shape of the aftertreatment component 106.

In one embodiment, an apparatus to measure differential pressure across a conduit flow area may comprise a first 102 and second 104 fluid conduit portion comprising differing cross-sectional areas, an aftertreatment component 106 configured with a flow inlet 108 and a flow outlet 110. The flow inlet 108 may accept flow from the first fluid conduit portion 102, and the flow outlet 110 may emit flow to the second fluid conduit portion 104. The apparatus may further comprise a first sensor port 112 fluidly connected to the first fluid conduit portion 102.

The schematic flow chart diagrams herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 6:
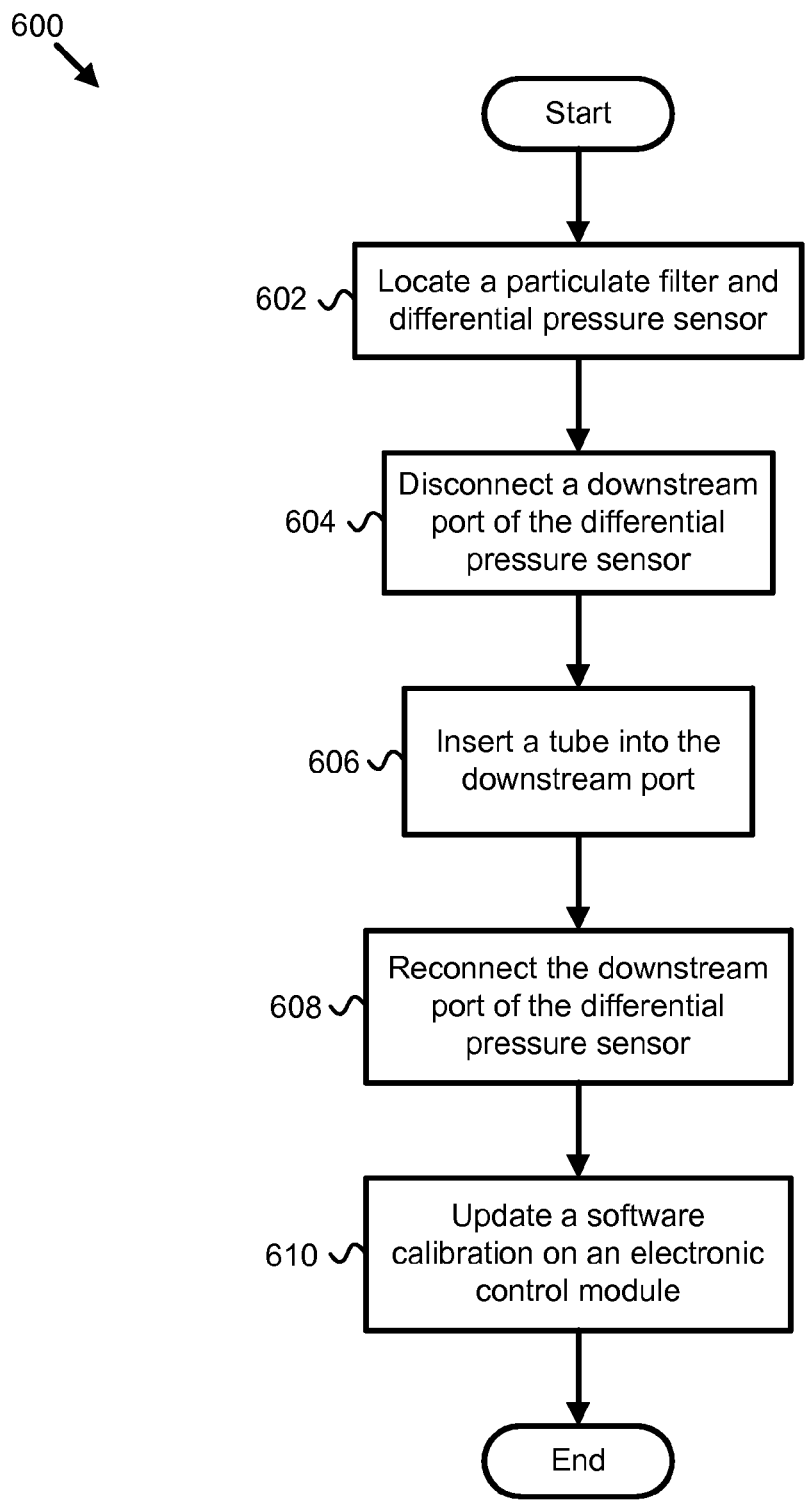
FIG. 6 is a schematic flow chart illustrating one embodiment of a method for differential pressure measurement across a fluid conduit flow area change in accordance with the present invention.

FIG. 6 is a schematic flow chart illustrating one embodiment of a method 600 for differential pressure measurement across a fluid conduit flow area change in accordance with the present invention. The method 600 may include a practitioner locating 602 an aftertreatment component 106 within an exhaust fluid conduit 102, 104 and a differential pressure sensor 120 configured to measure the differential pressure across the aftertreatment component 106. The cross-sectional area of the upstream fluid conduit portion 102 may differ from the cross-sectional area of the downstream fluid conduit portion 102. The practitioner may disconnect 604 a downstream port (not shown) of the differential pressure sensor 120 coupled to the exhaust fluid conduit 104 on the downstream side of the aftertreatment component 106. The practitioner may then insert 606 a tube 118 into the downstream port, the tube 118 comprising at least one opening 114, and the tube 118 configured such that the at least one opening 114 is within a uniform flow region 116 of the exhaust fluid conduit 104.

For example, an application may comprise a differential pressure sensor 120 connected to the downstream fluid conduit 104. A conventional system will have the sensor 120 tap into the fluid conduit 104 at the outer wall and read the pressure from the edge of the conduit 104. A practitioner may disconnect the sensor 120 from the fluid conduit 104 wall, insert a tube 118 with an opening 114 into the previous opening in the fluid conduit 104 wall, where the tube 118 is configured such that the opening 114 will be within the uniform flow region 116 when the tube 118 is inserted.

The practitioner may then reconnect 608 the downstream port of the differential pressure sensor 120 to the tube 118 such that the second sensor port 114 comprises the hole 114 in the tube 118 fluidly connected to the uniform flow region 116. The practitioner may update 610 a software calibration on an ECM 122 to update a correlation between a parameter and the differential pressure across the aftertreatment component 106. For example, the software on the ECM 122 may be configured to estimate a soot loading on the aftertreatment component 106 based on the differential pressure across the filter 106. The characteristics of the pressure versus the soot loading may change after a practitioner installs the sensor 120 upgrade, and an upgrade to the software calibration on the ECM may improve the soot loading estimate.

In one embodiment, the software on the ECM 122 may trigger a fault code when a differential pressure across the aftertreatment component 106 exceeds a threshold. The practitioner may change this threshold after installing the tube 118 such that the fault code occurs when a similar amount of soot estimated to be trapped within the aftertreatment component 106 triggers the fault code prior to installing the tube 118. The changes in the pressure characteristic depend upon the particular application and installation, and are simple measurements within the skill of one in the art. The changes required in the software calibration may involve code changes or simple variable value changes, depending upon the particular application, and these changes are mechanical steps for one of skill in the art.

In one embodiment, the tube 118 may comprise a bent tube with a capped end 208 and a plurality of holes 114 on the sides 206 of the tube. Inserting 606 the tube 118 may further comprise orienting the tube such that the capped end 208 of the tube points axially toward the aftertreatment component 106.

From the foregoing discussion, it is clear that the invention provides a system, method, and apparatus for differential pressure measurement across a fluid conduit area change. The invention overcomes previous limitations in the art by providing improved differential pressure measurement in situations where the flow area changes induce differential pressure offsets in the conventional art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for measuring differential pressure, the apparatus comprising:
    a first elongate fluid conduit portion comprising a first minimum cross-sectional area perpendicular to an axis of the first elongate fluid conduit, and a second elongate fluid conduit portion comprising a second minimum cross-sectional area perpendicular to an axis of the second fluid conduit portion, wherein the first minimum cross-sectional area is different than the second minimum cross-sectional area;
    an aftertreatment component configured with a flow inlet and a flow outlet, wherein the flow inlet accepts flow from the first elongate fluid conduit portion, and wherein the flow outlet emits flow to the second elongate fluid conduit portion;
    a first sensor port fluidly connected to the first elongate fluid conduit portion;
    a coupler fluidly connecting a second sensor port to the second elongate fluid conduit at a uniform flow region.

2. The apparatus of claim 1, wherein the first minimum cross-sectional area is smaller than the second minimum cross-sectional.

3. The apparatus of claim 1, wherein the first minimum cross-sectional area is greater than the second minimum cross-sectional area.

4. The apparatus of claim 1, wherein the uniform flow region comprises a three-dimensional region located downstream from the face of the aftertreatment component, beginning at the face of the aftertreatment component and continuing to a distance equal to one-half an average width of the aftertreatment component.

5. The apparatus of claim 1, wherein the uniform flow region comprises a three-dimensional region located downstream from the face of the aftertreatment component, beginning one-tenth inch downstream of the aftertreatment component face and continuing to a distance equal to one inch downstream of the aftertreatment component.

6. The apparatus of claim 1, further comprising a perforated ring coupled to the downstream end of the aftertreatment component, wherein the uniform flow region comprises a three-dimensional region located within the perforated ring.

7. The apparatus of claim 1, further comprising a perforated ring coupled to the downstream end of the aftertreatment component, wherein the uniform flow region comprises a three-dimensional region located downstream from the face of the aftertreatment component, beginning at the face of the aftertreatment component and continuing to a distance equal to one-half an average width of the aftertreatment component beyond the axial extent of the perforated ring.

8. The apparatus of claim 1, wherein the coupler comprises an opening in a tube, the tube inserted into the second fluid conduit portion such that the opening is within the uniform flow region.

9. The apparatus of claim 1, further comprising a tube, the tube comprising an axial portion comprising sides and a capped end pointing toward the downstream face of the aftertreatment component, and wherein the coupler comprises a plurality of openings in the sides of the axial portion of the tube.

10. The apparatus of claim 1, wherein the aftertreatment component comprises a particulate filter.

11. An apparatus for measuring differential pressure, the apparatus comprising:
   a first fluid conduit portion comprising a first minimum cross-sectional area perpendicular to an axis of the first fluid conduit, and a second fluid conduit portion comprising a second minimum cross-sectional area perpendicular to an axis of the second fluid conduit portion, wherein the first minimum cross-sectional area is different than the second minimum cross-sectional area;
   an aftertreatment component configured with a flow inlet and a flow outlet, wherein the flow inlet accepts flow from the first fluid conduit portion, and wherein the flow outlet emits flow to the second fluid conduit portion;
   a first sensor port fluidly connected to the first fluid conduit portion;
   a coupler fluidly connecting a second sensor port to the second fluid conduit portion, such that the second sensor port fluidly connects to the second fluid conduit portion at a uniform flow region of the second fluid conduit portion; and
   wherein the coupler comprises an opening in a tube, the tube inserted into the second fluid conduit portion such that the opening is within the uniform flow region.

12. The apparatus of claim 11, wherein the first minimum cross-sectional area is smaller than the second minimum cross-sectional area.

13. The apparatus of claim 12, wherein the uniform flow region comprises a three-dimensional region located downstream from the face of the aftertreatment component, beginning at the face of the aftertreatment component and continuing to a distance equal to one-half an average width of the aftertreatment component.

14. The apparatus of claim 12, wherein the uniform flow region comprises a three-dimensional region located downstream from the face of the aftertreatment component, beginning one-tenth inch downstream of the aftertreatment component face and continuing to a distance equal to one inch downstream of the aftertreatment component.

15. The apparatus of claim 11, wherein the first cross-sectional area is greater than the second minimum cross-sectional area.

16. The apparatus of claim 15, further comprising a tube, the tube comprising an axial portion comprising sides and a capped end pointing toward the downstream face of the aftertreatment component, and wherein the coupler comprises a plurality of openings in the sides of the axial portion of the tube.

17. The apparatus of claim 11, wherein the aftertreatment component comprises a particulate filter.

18. A method for upfitting a differential pressure measurement on an aftertreatment system, the method comprising:
   providing an aftertreatment component with a first fluid conduit portion upstream of the aftertreatment component, and a second fluid conduit portion downstream of the aftertreatment component, the first fluid conduit portion comprising a first minimum cross-sectional area perpendicular to an axis of the first fluid conduit portion and the second fluid conduit portion comprising a second minimum cross-sectional area perpendicular to an axis of the second fluid conduit portion;
   providing a differential pressure sensor configured to measure the differential pressure across the aftertreatment component, the differential pressure sensor comprising a first sensor port fluidly connected to the first fluid conduit portion and a second sensor port fluidly connected to the second fluid conduit portion;
   disconnecting the second sensor port of the differential pressure sensor;
   installing a coupler fluidly connecting the second sensor port to the second fluid conduit at a uniform flow region by inserting a tube into the second fluid conduit, the tube comprising at least one opening, the tube configured such that the at least one opening is within the uniform flow region of the second fluid conduit, and reconnecting the second sensor port of the differential pressure sensor such that the second sensor port fluidly communicates with the tube.

19. The method of claim 18, further comprising updating a software calibration on an electronic control module to update a correlation between a parameter and the differential pressure across the aftertreatment component.

20. The method of claim 18, wherein the tube further comprises a bent tube with a capped end and a plurality of holes on the sides of the tube, and wherein inserting the tube into the second sensor port further comprises orienting the tube such that the capped end of the tube points axially toward the aftertreatment component.

21. The method of claim 18, wherein the first minimum cross-sectional area is greater than the second minimum cross-sectional area.

22. The method of claim 18, wherein the second minimum cross-sectional area is greater than the first minimum cross-sectional area.

23. The method of claim 18, wherein the aftertreatment component comprises a particulate filter.

* * * * *